United States Patent
Hemphill et al.

(10) Patent No.: US 6,490,617 B1
(45) Date of Patent: Dec. 3, 2002

(54) ACTIVE SELF DISCOVERY OF DEVICES THAT PARTICIPATE IN A NETWORK

(75) Inventors: John M. Hemphill, Harris County, TX (US); Steven E. Fairchild, Harris County, TX (US); James A. Rozzi, Harris County, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/093,677

(22) Filed: Jun. 9, 1998

(51) Int. Cl.⁷ .......................................... G06F 15/173
(52) U.S. Cl. ................................ 709/223; 709/224
(58) Field of Search ................ 709/203, 204, 709/220, 501, 303, 224, 223; 340/5.8

(56) References Cited

U.S. PATENT DOCUMENTS

| | | | | |
|---|---|---|---|---|
| 5,425,026 A | * | 6/1995 | Mori | 370/410 |
| 5,481,706 A | * | 1/1996 | Peek | 710/200 |
| 5,845,081 A | * | 12/1998 | Rangarajan et al. | 709/224 |
| 5,855,020 A | * | 12/1998 | Kirsch | 707/10 |
| 5,909,549 A | * | 6/1999 | Compliment et al. | 709/223 |
| 5,931,917 A | * | 8/1999 | Nguyen et al. | 709/250 |
| 5,968,116 A | * | 10/1999 | Day, II et al. | 709/202 |
| 5,991,305 A | * | 11/1999 | Simmons et al. | 370/422 |
| 5,991,806 A | * | 11/1999 | McHann, Jr. | 709/224 |
| 5,996,010 A | * | 11/1999 | Leong et al. | 709/223 |
| 6,003,077 A | * | 12/1999 | Bawden et al. | 709/223 |
| 6,006,019 A | * | 12/1999 | Takei | 709/224 |
| 6,041,349 A | * | 3/2000 | Sugauchi et al. | 709/223 |
| 6,041,350 A | * | 3/2000 | Takimoto | 709/223 |
| 6,044,468 A | * | 3/2000 | Osmond | 713/201 |
| 6,047,330 A | * | 4/2000 | Stracke, Jr. | 709/238 |
| 6,052,727 A | * | 4/2000 | Kamalanathan | 709/224 |
| 6,054,987 A | * | 4/2000 | Richardson | 345/348 |
| 6,055,570 A | * | 4/2000 | Nielsen | 709/224 |
| 6,058,445 A | * | 5/2000 | Chari et al. | 710/103 |
| 6,085,243 A | * | 7/2000 | Fletcher et al. | 709/224 |
| 6,092,109 A | * | 7/2000 | Goto et al. | 709/224 |
| 6,101,528 A | * | 8/2000 | Butt | 709/203 |
| 6,125,390 A | * | 9/2000 | Touboul | 709/223 |
| 6,131,119 A | * | 10/2000 | Fukui | 709/224 |
| 6,148,355 A | * | 11/2000 | Mahalingam | 710/104 |
| 6,157,956 A | * | 12/2000 | Jensen et al. | 709/246 |
| 6,182,136 B1 | * | 1/2001 | Ramanathan et al. | 709/202 |
| 6,236,983 B1 | * | 5/2001 | Hofmann et al. | 706/47 |
| 6,243,748 B1 | * | 6/2001 | Arai | 709/223 |
| 6,269,456 B1 | * | 7/2001 | Hodges et al. | 714/38 |
| 6,288,716 B1 | * | 9/2001 | Humpleman et al. | 345/329 |
| 6,300,863 B1 | * | 10/2001 | Cotichini et al. | 340/5.8 |
| 6,336,138 B1 | * | 1/2002 | Caswell et al. | 345/440 |
| 6,360,260 B1 | * | 3/2002 | Compliment et al. | 709/223 |

OTHER PUBLICATIONS

Berners–Lee, RFC 1945, "Hypertext Transfer Protocol—HTTP/1.0", May–1996, http://rfc.fh–koeln.de/rfc, pp. 1–60.*

* cited by examiner

Primary Examiner—Mehmet B. Geckil
Assistant Examiner—Bunjob Jaroenchonwanit
(74) Attorney, Agent, or Firm—Akin, Gump, Strauss, Hauer & Feld, L.L.P.

(57) ABSTRACT

An active self discovery system and method for a network. The network includes a management server having a corresponding server address and one or more managed devices. The management server includes a management database that is used to store management information and corresponding network addresses for each of the managed devices. Each managed device includes an active discovery agent that initiates management by sending its management information and network address to the management server. The managed device sends its management information upon initialization or anytime after the device becomes active on the network. Also, the managed device sends updated management information to the management server if and when the management information changes. Such changes include any status or configuration changes of the managed device or a new network address if the device's address is dynamically changed. Communication may be according to HTTP, where the management information is sent using HTTP post transactions. The HTTP post transactions may comprise HTML forms field formatted data and/or a tagged entity body with a MIME descriptor.

16 Claims, 5 Drawing Sheets

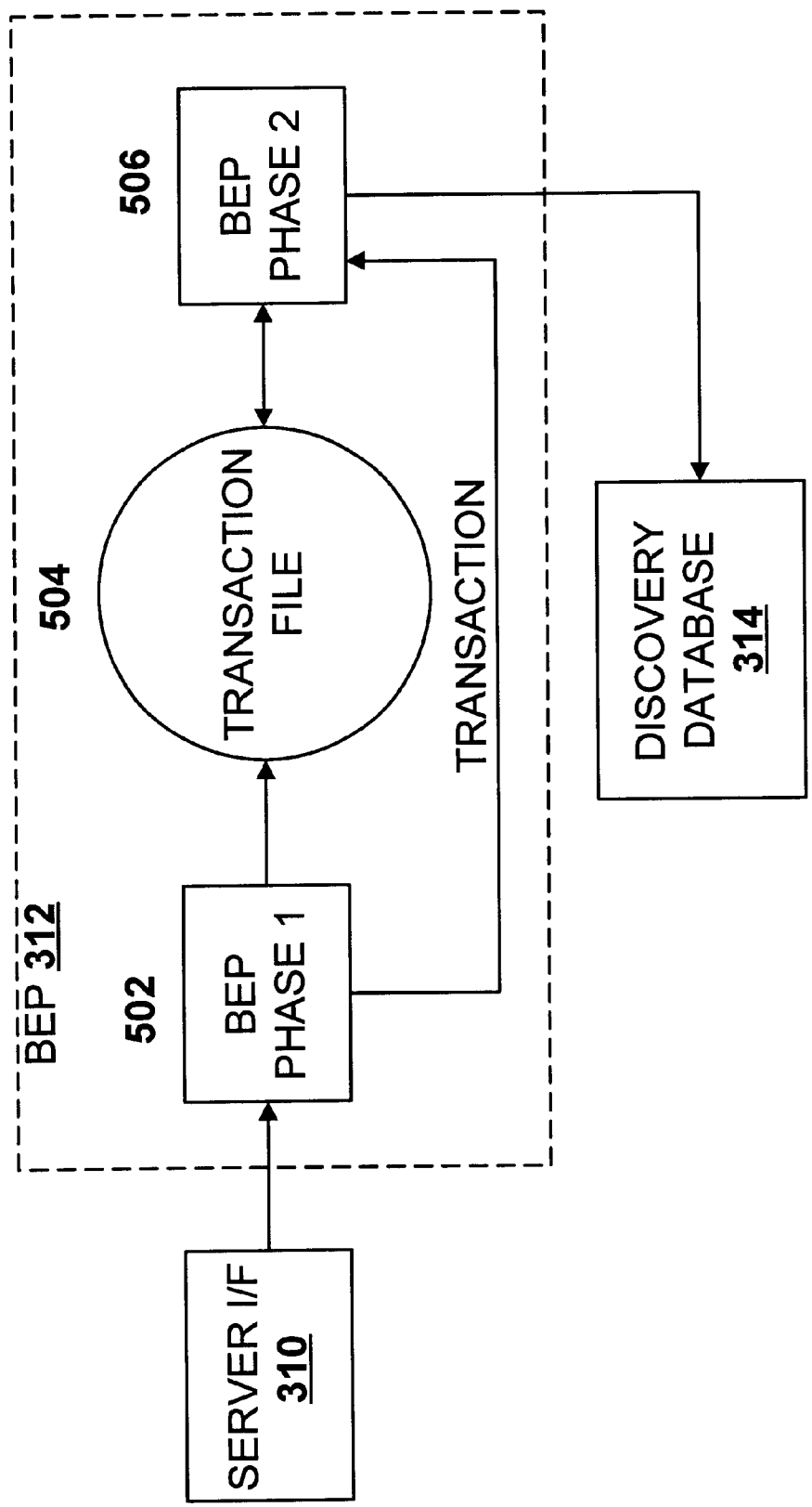

ACTIVE SELF DISCOVERY OF DEVICES THAT PARTICIPATE IN A NETWORK

FIELD OF THE INVENTION

The present invention relates to systems and network management, and more particularly, to a method and system for active self discovery of devices that participate in a network.

DESCRIPTION OF THE RELATED ART

In computer network environments, it is advantageous to manage the various software and hardware components coupled to the network from a central location or from a remote location. Such central or remote management of a network is commonly accomplished using industry standard protocols, such as the Simple Network Management Protocol (SNMP) or the Desktop Management Interface (DMI). The discovery of devices on a network is a requirement for management of those devices by management software. Traditional network discovery is performed in one of the several ways. One method is called explicit discovery, where the network address of the device is explicitly specified to the management software. Another traditional method is Internet Protocol (IP) pinging, where the management software enumerates a range of network addresses and individually pings the addresses to detect active devices. Yet another traditional method is performed using router tables, where the management software collects potential device addresses from network router tables.

In the case of explicit discovery, it is necessary to learn the address of each device and enter the value in the management software. This is a time consuming process in a network of any substantive size. Additionally, since many devices are dynamically assigned network addresses, the explicitly entered information may become invalid with the passage of time. IP pinging is time consuming, consumes network bandwidth, and may produce inconclusive results. Additionally, when the presence of the device is detected, no information as to what sort of device has been detected is available. The use of router tables is also subject to similar deficiencies as IP pinging.

In all of these traditional cases, the fact that the address of a device can be dynamically changed is an ongoing problem. Once a device's address is changed, the management software is no longer be able to communicate with it. These techniques rely on low level network protocols, and changes in network infrastructure technology often renders these traditional methods less effective or even non-effective.

It is desired to provide a network management system with improved discovery of devices attached to or that otherwise participate in a network. It is desired to reduce network traffic related to management functions, such as discovery, and to enable device information to remain updated regardless of network changes. It is desired to provide information about devices at the time of discovery, rather then requiring continued communication.

SUMMARY OF THE INVENTION

A network management discovery system for a network according to the present invention includes a management server having a corresponding server address and at least one managed device. The management server includes a management database that is used to store management information and corresponding network addresses received from the network. The one or more managed devices each include an active discovery agent which initiates management of the corresponding managed device by sending management information to the management server using the server address. In this manner, the management server is automatically provided with the management information and network address of each managed device that supports active self discovery.

The managed device may send its management information and its network address upon initialization, such as upon power-up or reset. In this manner, management of the managed device begins once the managed device becomes active on the network. Furthermore, the managed device may send updated management information to the management server if and when the management information changes. Such changes may include, for example, any status or configuration changes of the managed device. Also, the managed device may send a new network address to the management server if the network address of the managed device is dynamically changed. In this manner, the active discovery agent of the managed device keeps the management server updated with any management information changes in a very efficient manner.

The management server may include a network interface and a back end process or module that processes management information and network addresses received via the network into the management database. The back end module may comprise a single processes that strips management information from each management package, formulates the information into an appropriate format for the management database and stores the information therein. Alternatively, the back end module is split into at least two separate processes and an intermediate transaction file. For example, the back end module may include a first module that transfers management information and addresses into the transaction file as received, and a second module that processes the management information and addresses from the transaction file into the management database. In this manner, the first back end module is able to quickly transfer management packages into the intermediate file with little processing to reduce network overhead associated with management. The second module processes the management information independently of the network and thus without adding further management overhead to the network.

The active discovery agent may support the HyperText Transfer Protocol (HTTP) and act as an HTTP client to send the management information, where the management server includes a web server that supports HTTP. In this manner, the active discovery agent and the web server communicate according to HTTP. The server address may be an actual address or may comprise a symbolic address. For HTTP, the symbolic address is resolved into an Internet Protocol address using the Domain Naming Service (DNS) or the like. For HTTP, the active discovery agent may formulate the management information and the network address into an HTTP post transaction that is sent to the web server according to HTTP. The HTTP post transaction may include an entity body or payload. The content of the entity body may be described by an HTTP content-type tag, which may further be described using a Multipurpose Internet Mail Extension (MIME) descriptor.

A method of active self discovery of devices participating in a network according to the present invention, for a network that includes at least one managed device and a management server, includes steps of providing a managed device with a server address corresponding to the management server, formulating, by the managed device, management information and a network address corresponding to the managed device into a management package, and sending, by the managed device, the management package to the management server using the server address to initiate management of the managed device. In this manner, the management server is not required to initiate management and is automatically provided management information from each managed device which supports active self discovery.

During operation, the managed device further may formulate and send updated management packages each time the management information changes. Such changes may include, for example, status or configuration changes or a change of the network address of the managed device. The method may further comprising processing, by the management server, any management packages received via the network into a management database. Such processing may be performed by a single back end process or a split process for faster response and reduced network overhead. The method may further comprise formulating a management package into an HTTP post transaction and sending the HTTP post transaction to the management server according to HTTP. Again, the HTTP post transaction may include an entity body or payload. The content of the entity body may be described by an HTTP content-type tag, which may further be described using a MIME descriptor.

It is appreciated that active self discovery according the present invention provides a network management system with improved discovery of devices. Active self discovery reduces network traffic related to management functions and enables device management information to remain updated regardless of network changes. The management server is automatically provided information about managed devices at the time of discovery, and does not have to rely on traditional discovery methods such as explicit discovery, IP pinging, router tables, etc. Such traditional methods usually require continued communication that significantly reduces network bandwidth available for normal communications.

BRIEF DESCRIPTION OF THE DRAWINGS

A better understanding of the present invention can be obtained when the following detailed description of the preferred embodiment is considered in conjunction with the following drawings, in which:

FIG. 5 is a block diagram illustrating a back end process implemented as two separate processes and an intermediate file to further reduce network overhead associated with network management.

DETAILED DESCRIPTION OF THE PREFERRED EMBODIMENTS

Figure 1:
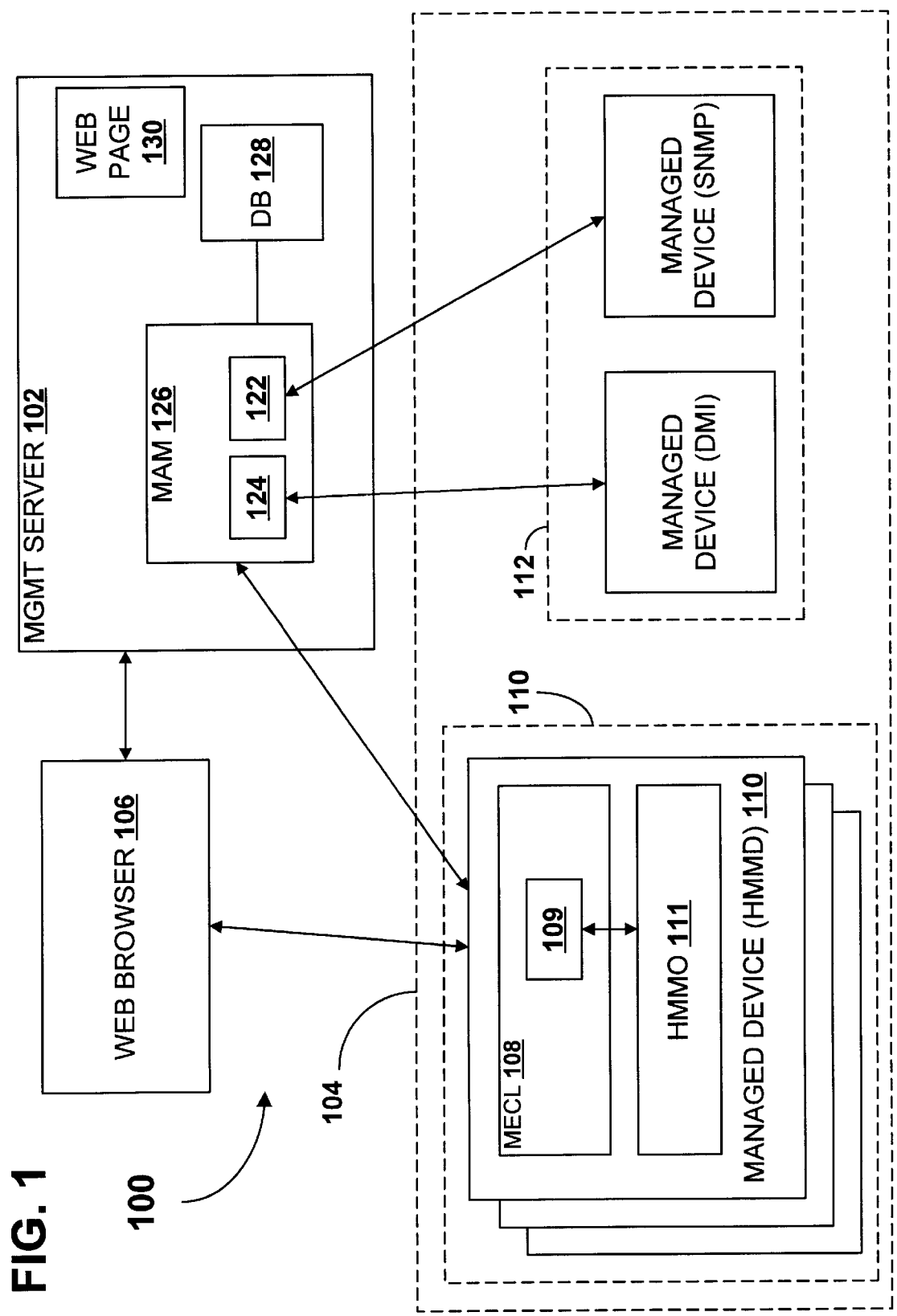
FIG. 1 is a block diagram of a web-based management network.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements 104, and a client system 106 that are coupled together using any one or more network architectures or technologies, such as Ethernet®, ATM, Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems with corresponding network interface cards (NICs), such as desktops, portables, personal computer systems (PCs), servers, workstations, etc. as well as other networking devices, such as switches, repeaters, routers, hubs, etc. The managed elements 104 are generally divided into two different types, including web-enabled devices or Hyper-Media Managed Devices (HMMDs) 110 and legacy devices 112. The legacy devices 112 include those devices implemented with the Simple Network Management Protocol (SNMP), the Desktop Management Interface (DMI), or similar type management systems known to those skilled in the art.

The HMMDs 110 each include one or more management agents called Hyper-Media Managed Objects (HMMO) 111, described further below. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser for accessing and displaying management information from the management server 102 or any of the HMMDs 110. Examples of web browsers include MicroSoft® Internet Explorer for Windows 95® or Windows NT® and Netscape Navigator™ for Windows 95®, Windows NT® or HP/UX by Hewlett Packard. Other web browsers are contemplated as well. It is desired that the web browser support a scripting language, such as JavaScript or the like. Scripting language includes instructions interpreted by the browser to perform certain functions, such as how to display data. The client system 106 generally replaces the management console of an SNMP management system, providing access to either the HMMDs 110 or the management server 102.

The management server 102 preferably uses an appropriate operating system (OS) such as Windows NT® or the like. The management server 102 also executes or otherwise operates as a Hyper-Media Management Application (HMMA) that provides management services for all of the managed elements 104 including the HMMDs 110 and the legacy devices 112. The management server 102 may serve as the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 may operate as self-describing web agents that use common web-enabling components to provide registration, discovery, security and HTTP communications. The HMMO web agents render information in HTML, or in scripting language, or a combination of both, for viewing by a browser on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the HMMA. In this manner, the management server 102 is adaptable and flexible depending upon specific embodiment needs. The management server 102 also generates a home page 130 accessible by any appropriate web browser, such as that executing on the client system 106 or on the management server 102 itself.

The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 may discover devices on the network using IP pinging for IP devices, SAP broadcasts for Internetwork Packet Exchange (IPX) devices and is extendable to enable other discovery mechanisms. The management server 102 periodically collects and saves configuration information in the database 128 in a common form regardless of whether the information was originally web-based, SNMP or DMI. For example, the management server 102 stores events and traps, and enables configuration of 15 filters that ultimately generate queries that are used to select records from the database 128. The management server 102 also enables access of the database 128. The database 128 is preferably based on SQL Server by Microsoft® and is accessed via Java™ DataBase Connectivity (JDBC) or Object DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events and allows a user to set event filters.

As described previously, the client system 106 includes a web browser for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. Each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 may also perform security functions.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem, where the resolution may be performed either programmatically or by providing a list of steps for the user to follow.

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data. The user has to configure the situations. The threshold tools allow the user to monitor management data and be notified whenever certain conditions arise. Another action category is action advisories, which are actions that notify the user whenever an event is needed to be performed, such as service advisories generated by the manufacturer of the management server 102. Other advisory examples include backups, disk storage cleanup, etc. Tools for this category provide the details of the action advisory and may allow corrective action. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar types of traps or events is received. The trap is turned into an action that is operated on just as any other action. The tools in this category allow the user to forward the trap to other management consoles, to page the user, provide correlation, etc.

In general, management is often classified by what is being managed: Hardware, Operating System, Software, etc. The following Table 1 illustrates the layers and the management data that is typical of that layer. It is noted that Table 1 is by no means exhaustive and simply provides typical management data for the corresponding layer.

TABLE 1

Management Layers and Corresponding Typical Management Data

| Managed Layer | Examples of managed data at each layer |
| --- | --- |
| Applications (Vertical, specialized applications) | Transactions per second Application specific data, such as status of batch processing activities |
| Databases, web servers, | Table space used Number of locks set |
| So-called "Horizontal" applications | Resources used - percent of system work areas, etc. |
| Operating System | Number of processes Interrupts per second being serviced Percent of CPU time spent in user state Names of processes |
| Hardware | Configuration: serial number of disk drive, bytes of RAM installed, etc. Operational: number of bytes sent by Ethernet controller, number of packet collisions on Ethernet, temperature of CPU cabinet, etc. |

Figure 2:
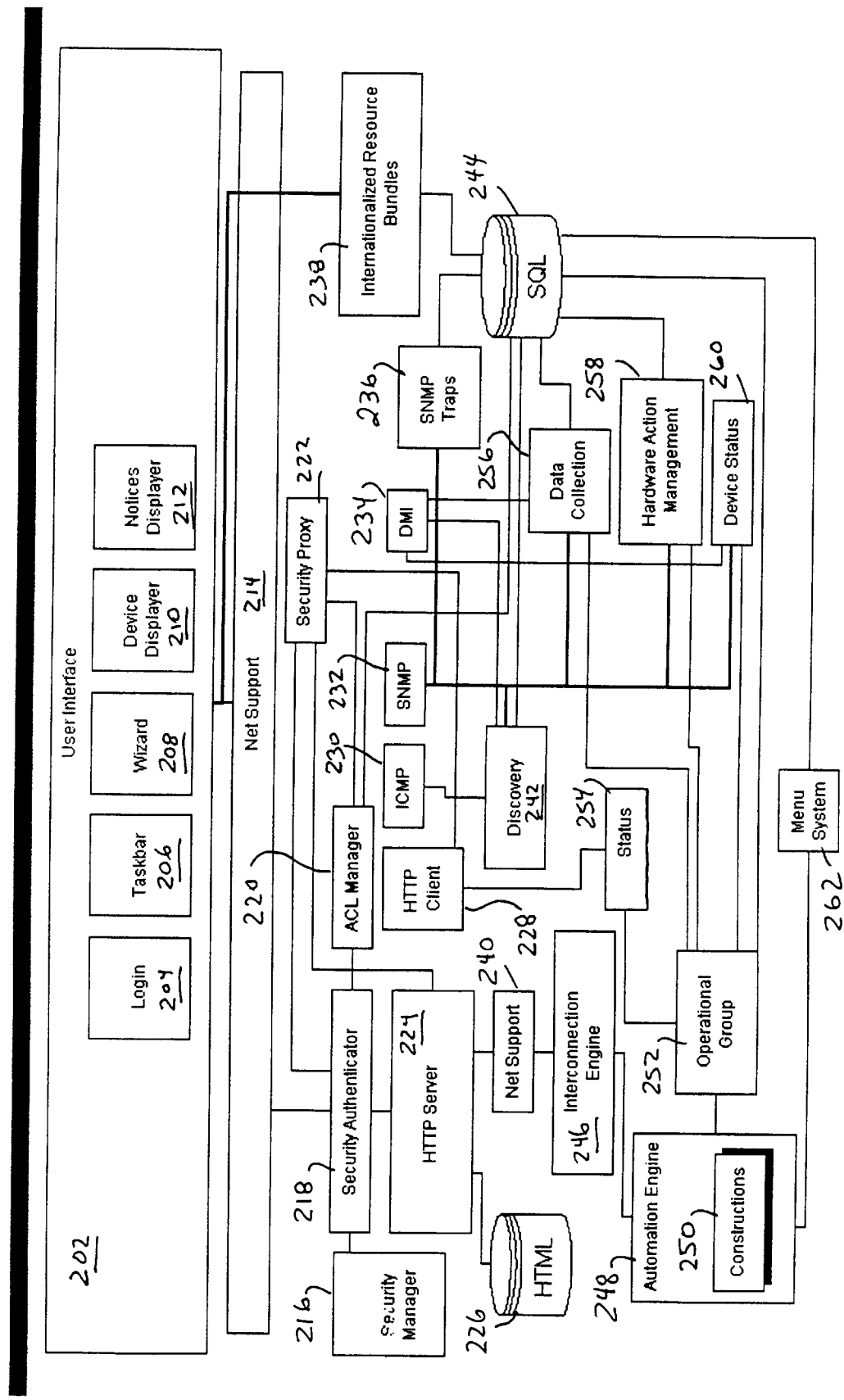
FIG. 2 is a more detailed block diagram of the management server of FIG. 1.

Referring now to FIG. 2, a more detailed block diagram of the management server 102 is shown. A User Interface 202 is provided with a plurality of modules that are preferably rendered on a web browser of the management server 102. The User Interface 202 includes a Login module 204, a Taskbar module 206, a Wizard module 208, a Device Displayer module 210 and a Notices Displayer module 212. The Login module 204 is a login applet which gains the user access to the management server 102. The Taskbar module 206 includes management server menus. The Wizard module 208 includes applets for guiding and assisting the user through tasks on the management server 102. The Device Displayer module 210 is an applet which displays information about selected devices. The Notices Displayer module 212 is an applet which displays event-based information. A Net Support layer 214 interfaces the User Interface 202 and includes Java™ or JavaScript classes that underlie other components that handle asynchronous communications to and from the management server 102.

The management server 102 includes a Security Manager module 216, which manages creation, deletion and modification of user accounts. The Security Manager module 216 interfaces a Security Authenticator module 218, which checks incoming requests for proper access rights and denies access if appropriate. The Security Authenticator module 218 interfaces the Net Support module 214 and an Access Control List (ACL) Manager module 220, which manages the privileges associated with each type of user account. The ACL Manager module 220 and the Security Authenticator module 218 each interface a Security Proxy module 222, which proxies requests from the user's browser to web agents, adding necessary security information to avoid having to log in to each web agent.

The Security Authenticator module 218 and the Security Proxy module 222 each interface an HTTP Server module 224, which runs at an alternate port for special purpose enterprise management. The HTTP Server module 224 interfaces an HTML database 226, which includes miscellaneous HTML pages and scripts used by the User Interface 202 of the management server 102. The Security Proxy module 222 interfaces an HTTP Client module 228, which is used to initiate HTTP requests to other devices. An ICMP module 230 sends ICMP packets on the network to implement IP pinging, if necessary. An SNMP module 232 is provided which includes SNMP communications modules. A DMI module 234 is provided which includes DMI communications modules. The SNMP module 232 interfaces an SNMP Traps module 236, which handles the reception of SNMP traps and converts them to management server notices. The User Interface 202 interfaces an Internationalized Resource Bundles module 238, which manages resource bundles for applets for different languages. The SNMP Traps module 236 and the Internationalized Resource Bundles module 238 each interface a SQL database 244, which includes discovery, device, activity and results information and corresponds to the management database 128. A Discovery module 242 interfaces the ICMP module 232, the SNMP module 232, the DMI module 234 and the SQL database 244. The Discovery module 242 finds devices on the management network 100 and identifies them.

The HTTP Server module 224 interfaces a Net Support module 240, which comprises a server side portion of communication to applets (Net Support in browser) that activates server functionality based on incoming requests, and returns results and other asynchronous notification information. The Net Support Module 240 interfaces an Interconnection Engine module 246, which is responsible for connecting together events with the listeners of the events. The Interconnect Engine module 246 has support for registering to receive events and for firing events. The Interconnect Engine module 246 interfaces an Automation Engine module 248, which loads constructions, fetches components and sets object properties to perform management functions. The Automation Engine module 248 supports conditional operations that affect the next operation performed, based on the results of a completing operation. The Automation Engine module 248 includes a Construction module 250, which operates as a listener of events composed of many components wired together to perform one management function or a portion of a management function.

The Automation Engine module 248 interfaces an Operational Group module 252, which accesses the SQL database 244, runs SQL queries periodically and performs the specified management functions upon addition or removal of a device or event from the result set. The HTTP Client module 228 and the Operational Group module 252 interface a Web Agent Status module 254, which performs a management function to track the status of web agents. The DMI module 234, the SNMP module 232 and the Operational Group module 252 interface a Data Collection module 256, which performs a management function to collect configuration data from devices and saves the configuration in the SQL database 244. The SNMP module 232 and the Operational Group module 252 interface a Hardware Action Management module 258, which performs a management function that takes further action to try and resolve hardware problems or check on whether the problem still exists. The Hardware Action Management module 258 accesses the SQL database 244. The DMI module 234, the SNMP module 232 and the Operational Group module 252 interface a Device Status module 260, which performs a management function that tracks the status of SNMP and DMI devices. A Menu System module 262 interfaces the Automation Engine module 248 and accesses the SQL database 244 and builds menus for the User Interface 202 based on user privilege, language and location.

Figure 3:
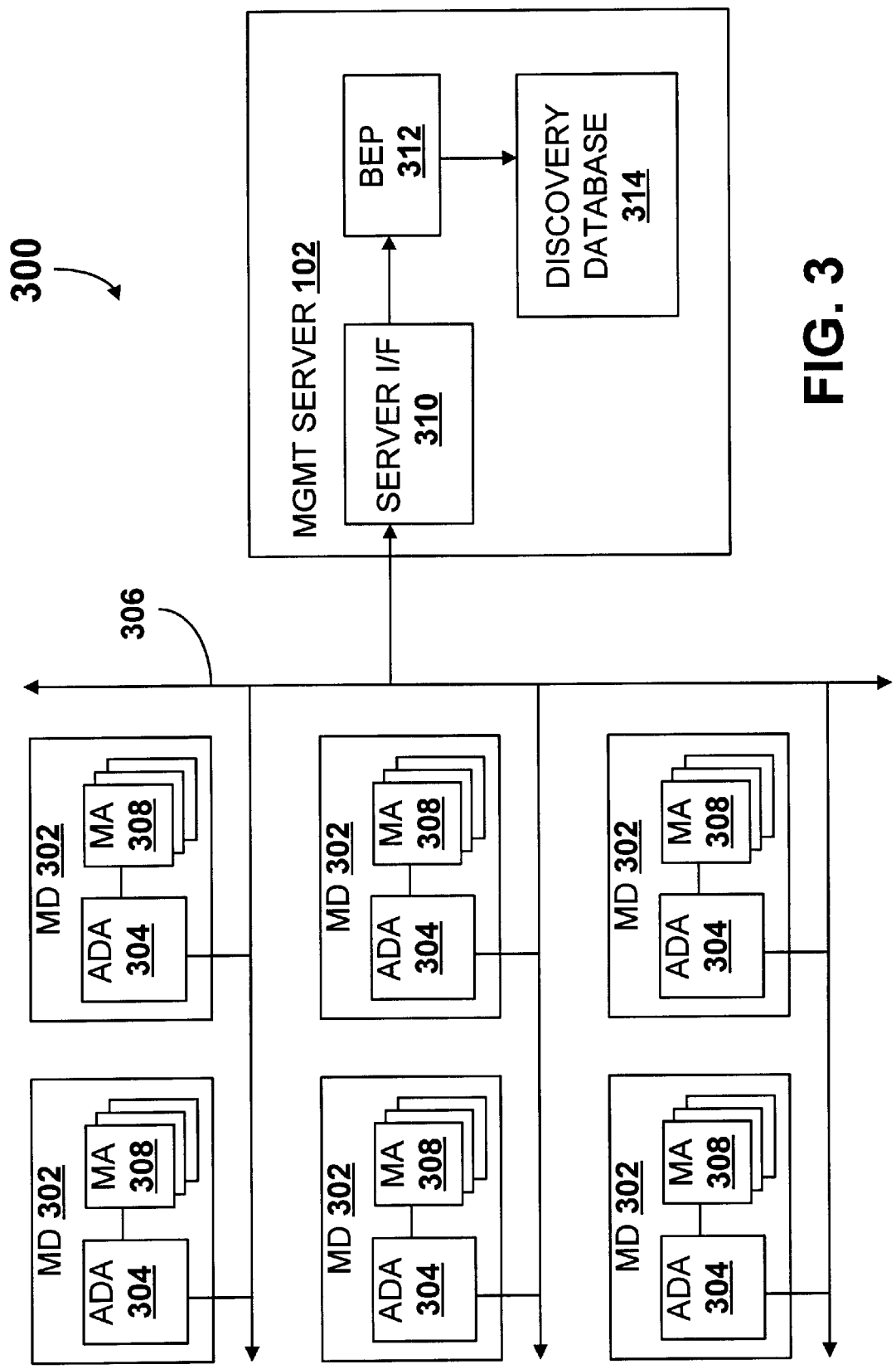
FIG. 3 is a simplified block diagram illustrating a management network that supports active self discovery according the present invention.

Referring now to FIG. 3, a simplified block diagram is shown of a management network 300 that supports active self discovery according the present invention. The management network 300 also preferably enables management of both hardware and software components over a network using Internet technology. A plurality of managed devices or MDs 302 are shown coupled to the management server 102 via network media 306. Each MD 302 may be implemented in a similar manner as any of the managed devices previously described, including the HMMDs 110 and the legacy devices 112, and may comprise any type of computer with one or more corresponding NICs or the like, such as a server, desktop, portable, PC, workstation etc. or any other type of system or network device, such as a router, switch, repeater, hub, etc. The MDs 302 are coupled to the media 306 in any desired manner depending upon the type of media and architecture or technology, such as Ethernet®, ATM, Token Ring, etc. The management network 300 preferably supports the World Wide Web and TCP/IP services. The management network 300 may be any type of network or network topology such as a separate intranet, part of the Internet itself, an intranet with access via a gateway or firewall to the Internet, etc.

Each MD 302 includes an active discovery agent (ADA) 304, which is a software component that communicates with a server interface (I/F) 310 within the management server 102. Any HMMD 110 or any of the legacy devices 112 include an ADA 304 to support active self discovery. The ADA 304 and the server I/F 310 of the management server 102 may communicate in any desired manner, such as according to the HTTP protocol. For HTTP, which is an extendible, general protocol that is layered on top of the TCP protocol layer, the ADA 304 operates as an HTTP client and the server I/F 310 comprises a web server that supports the HTTP protocol.

Each MD 302 also includes one or more management agents (MA) 308 that each collect or otherwise report certain types of management information of the respective MD 302 to the respective ADA 304. The management information may be stored in a local memory. Alternatively, the management information is provided to the respective ADA 304 upon request. Each management agent 308 may include, for example, instrumentation code and a management communication layer (not shown). The management communication layer is responsible for understanding a management protocol such as SNMP, DMI, or HTTP-based communication. The management communication layer calls the instrumentation code to acquire data or to perform management control operations. The function and implementation of instrumentation code varies widely depending the hardware and software environment and on the level of management data. Several levels of management data are described in Table 1 above, including, but not limited to, hardware, the operating system (OS), software applications, etc.

As an example of acquiring hardware management data, a hardware management agent 308 includes instrumentation code that is used to execute input and output instructions in order to acquire information that describes the physical memory modules installed on a system board of a computer system. As an example of acquiring operating system management data, an OS management agent 308 includes instrumentation code that is used to execute instructions to access Windows NT's perfmon (performance monitor) counters to determine how many interrupts per second are being serviced by a CPU. Another role performed by instrumentation code of a management agent 308 is to execute control operations to effect management operations. An example of a control operation is to reboot a system or terminate a failed process. Although the management agents 308 may be implemented as code modules comprising software in a given implementation, the present invention is not limited to any particular implementation of management data collection system, and may comprise hardware, firmware, software, or any combination thereof.

Each ADA 304 is provided with a predetermined network address or network name of the management server 102. The address of the management server 102 may be provided in a symbolic form with the resolution of the symbolic form being accomplished by use of Domain Naming Service (DNS). DNS is a standard network protocol for name resolution. For example, each ADA 304 is pre-configured with a symbolic management server address such as "MANAGESERVER", where DNS is used to translate symbolic management server address into an actual IP address that is used to send packets for HTTP transactions. The ADA 304 may be provided with an actual address, or with a symbolic name where any suitable translation scheme may be used to resolve an actual address. In any event, the MD 302 is able to initiate management using the ADA 304 using the predetermined server address to send initial and updated management information to the management server 102. Thus, the management server 102 is not forced into the traditional methods of discovery to find manageable devices, since manageable devices using active self discovery initiate the management process. Nonetheless, the management server 102 may still use traditional methods of discovery to find any manageable devices that do not support active self discovery.

In general, each ADA 304 gathers management information into a management package and sends the management packet to the management server 102. For HTTP, the ADA 304 uses an HTTP POST function to forward discovery data to a Back End Process (BEP) 312 coupled to the server interface 310. In general, a POST transaction is used by an HTTP client to transmit information to an HTTP server using HTML forms field formatted data and/or an entity body or discover data payload. For an entity body or payload, the content of the entity body may be described by an HTTP content-type tag, which may further be described using a Multipurpose Internet Mail Extensions (MIME) descriptor or the like. The BEP 312 may be implemented as a web server back end process such as the Common Gateway Interface (CGI), the Internet Server Application Programming Interface (ISAPI) standard, the Netscape Server API (NSAPI) or any other suitable back end process. As a result, the discovery communication is platform independent.

Each ADA 304 supplies self descriptive discovery information within the management package, such as the device network address of the corresponding MD 302, the identification of the MD 302, or any other information required for management of the MD 302 such as type of platform, hardware configuration, software configuration, etc. The management package containing the self descriptive discovery information is forwarded to the BEP 312 using any one of several ways, such as by means of either HTML forms field formatted data or a entity body contained as part of an HTTP POST transaction. The content of the entity body may be described by an HTTP content-type tag, which may further be described using a MIME descriptor or the like. An HTML form field is appended to the end of the URL portion of an HTTP command using delimiter characters or the like. The general format of an HTTP POST transaction is as follows:

POST/ActiveDiscovery HTTP/1.0<cr><ln>

Accept: */*<cr><ln>

Content-Length:???<cr><ln>

Content-Type: text/plain

<cr><ln>

DeviceId=???<cr><ln>

Time=Tue, DD MMM YYYY hh:mm:ss GMT<cr><ln>

DeviceCondition=?<cr><ln>

IPAddress=???.???.???.???<cr><ln>

DeviceName=?<cr><ln> where the first line specifies a "POST" transaction, "Content-Length" specifies the length of the transaction, "Content-type" is a tag, such as an HTTP content-type tag that defines the type of entity body, where the tag may further be described using a descriptor such as a MIME descriptor, such as, for example, "text/plain", the carriage return, line feed pair following the content-type tag (<cr><ln>) ends the HTTP header, and an HTTP entity body or message payload, if present, follows the header, and comprises the remainder of the TCP message body. In this example, the entity body comprises a device packet, where "DeviceId" denotes a Universal Unique Identifier (UUID) of the corresponding MD 302, "Time" denotes the time of the last status change on the MD 302 (DD MMM YYYY denotes day, month and year, respectively and hh:mm:ss denotes hour, minutes, seconds, respectively), "DeviceCondition" denotes the current condition of the MD 302 (such as, for example, 0=Off Line, 1=On Line), "IPAddress" denotes the IP address of the MD 302, and "DeviceName" denotes the device name for the MD 302.

Regardless of whether the data is provided in an HTML form field or as an entity body, the management information in the management package may be compressed prior to be being sent to reduce the network bandwidth required to transmit the data. Additionally, the compressed or uncompressed data of the management package may also be encrypted. The use of an entity body with a tag and a tag descriptor, such as a MIME descriptor, allows the format and encoding of the data to be self describing. A MIME descriptor, for example, is read and interpreted to identify the format of the entity body or payload. The BEP 312 is constructed to interpret discovery data that arrives in different formats from different ones of the ADAs 304. The BEP 312 processes and stores the information into a discovery database 314, which is a relational database that is used to store the addresses of discovered devices attached to or otherwise participating in the network 300 as well as associated descriptive information about those devices. The discovery database 314 corresponds to the management database 128 and the database 244 and is a repository for device information, where the information has been discovered using active self discovery or any other suitable discovery method, such as any of the traditional discovery methods previously described.

Each ADA 304 is configured to execute and send management information to the management server 102 using the predetermined server address each time the MD 302 is made active on the network 300. In a computer system, for example, an MD 302 becomes active when the operating system is booted, which occurs at power-up, reset or initialization of the computer system. For example, an MD 302 may initialize and become active on the network and not send management information for a period of time after it becomes active. Initialization of the MD 302, however, is a particularly good time to initiate management functions of the MD 302 since the management server 102 is provided with the initial management information for the MD 302. Furthermore, each ADA 304 executes to supply discovery information upon any status change in the configuration or any change of management information of the corresponding MD 302. In this manner, the management server 102 is always apprised of the status of the MD 302 including any management or configuration changes, without having to periodically or continuously poll, interrupt or otherwise ping the MD 302.

Figure 4:
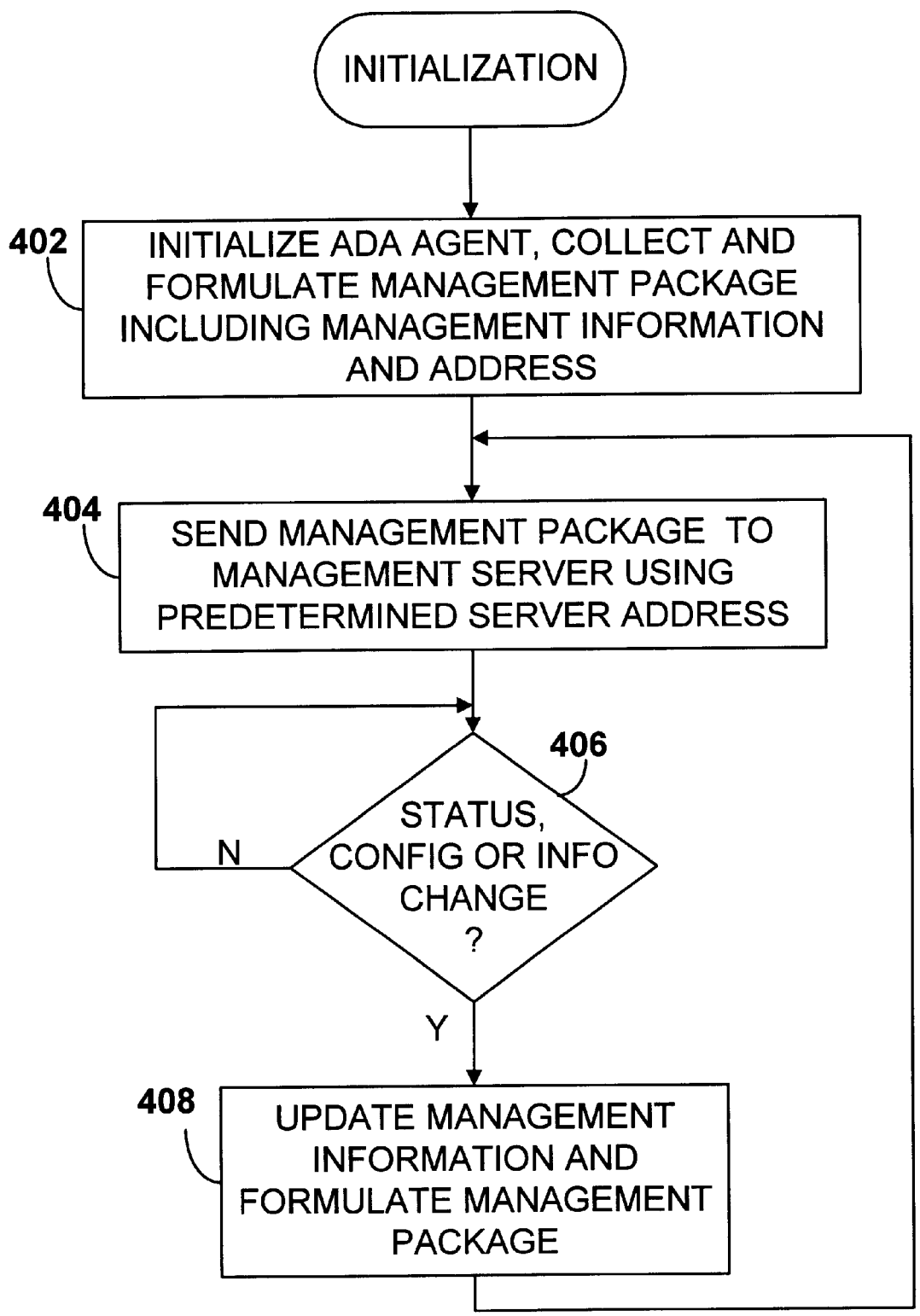
FIG. 4 is a flowchart diagram illustrating an active self discovery method according to the present invention.

FIG. 4 is a flowchart diagram illustrating an active self discovery process. Upon initialization of an MD 302, such as upon power-up or reset, the ADA 304, preferably implemented as agent software, is initialized and the management information of the MD 302 is collected and formulated into a management package or any form suitable for interpretation by the management server 102 at a first block 402. The network address, either actual or symbolic, is included in the management package to enable the management server 102 to identify the particular MD 302. At next block 404, the ADA 304 sends the management package including its management information to the management server 102. At next decision block 406, the MD 302 continuously or periodically determines whether the status of the MD 302 or its management information has changed, including any configuration changes or address changes. If there are no changes, operation loops at block 406.

If the status of the MD 302 or any of its management information changes, operation proceeds to next block 408, where the management information is updated to reflect the change. Also, a new or updated management package is formulated. Operation then returns to block 404 to send the management package including the updated management information to the management server 102. Operation repeats in this manner until the next power-up or reset. It is noted that block 406 may be implemented by or replaced with an interrupt method, where upon a change of the status of the management information, an interrupt is generated and the management information is updated and sent to the management server 102 in response to the interrupt. Each MD 302 that supports active self discovery operates in the same or in a similar manner. Thus, it is appreciated that the management server 102 is always provided with the current status of each MD 302 without having to periodically poll, interrupt or ping each MD 302.

Each ADA 304 includes the appropriate code, agent and/or logic that forwards the management information to the management server 102. The following is exemplary code of a FORWARD routine used in a particular embodiment of an ADA to forward management information to a server, such as the management server 102:

```
ForwardDiscoveryInformation()
{
    // collect information to build discovery POST transaction
    // assemble the HTTP transaction packet
    // use DNS or other naming service to resolve symbolic name
        // of mgt svr
    MgtSvrTargetAddress= resolveHostAddress(MgtSvrName);
    // Perform POST
    HTTPpost(MgtSvrTargetAddress,portno,HTTPpacket);
    return;
}
``` where "MgtSvrName" denotes a symbolic management server address to resolve an actual IP address using DNS or the like, "HTTPpost" denotes an HTTP post transaction, "portno" denotes a port number to forward the management information and "HTTPpacket" denotes a packet that contains the management information. An exemplary POST transaction is as follows:

POST/ActiveDiscovery HTTP/1.0<cr><ln>
Host: ManagementServer.domain.com
Accept-Language: en<cr><ln>
Accept-Charset: iso-8859-1,*,utf-8<cr><ln>
Content-Type: Text/Plain<cr><ln>
Content-length: nnn<cr><ln>
<cr><ln>
DeviceName=SERVER001
DeviceID=F101BFD9-E9D3-11d1-A0AF-00805FA6ECBE <cr><ln>
IPAddress=ddd.ddd.ddd.ddd<cr><ln>
WBEM-agents=YES<cr><ln>
SNMP-agents=YES<cr><ln>
DeviceType=Compaq Proliant 3000<cr><ln> where "Host" denotes the name of the management server, "DeviceName" denotes the device name for the particular MD 302, "DeviceId" denotes an identifier of the particular MD 302, such as a UUID, "IPAddress" is the IP address provided dotted quad notation, and "DeviceType" denotes the particular type of system or network device, such as, in this case, a ProLiant 3000 computer by Compaq Computer Corporation.

Referring now to FIG. 5, a block diagram is shown illustrating a more specific embodiment of the BEP 312, where the BEP 312 is implemented with two processes and an intermediate file. A BEP Phase 1 module 502 captures the discovery information from the server I/F 310 performing the POST transaction into a transaction file 504, which is an intermediate file for temporary storage of the management package including the management information. A BEP Phase 2 module 506 then processes the POST transaction into the appropriate format for storage in the discovery database 314.

The BEP Phase 1 module 502 need only perform minimal processing to transfer the contents of the HTTP POST transaction to the transaction file 504. The transaction file 504 is implemented in any one of several possible ways, including electronic memory such as random access memory (RAM), dynamic RAM (DRAM), static RAM (SRAM), etc., or any type of magnetic media such as a floppy or hard disk file, etc. The use of the transaction file 504 permits the HTTP POST transaction to complete relatively quickly. This is advantageous since an HTTP POST is a synchronous protocol operation, where the HTTP client is unable to continue processing until the HTTP POST transaction is completed.

The BEP Phase 1 module 502 is preferably a web server back end process that is executed whenever a POST is made to the back end URL by the ADA 304. It first parses the incoming management package, such as an HTTP packet, extracts the entity body of the package or packet, opens the transaction file 504 for an exclusive update (in the event of a multithreaded process), writes the entity body into a transaction record of the transaction file 504, closes the transaction file 504, and then provides a TRANSACTION signal to the BEP Phase 2 module to indicate that the transaction file 504 has been updated with a new transaction record.

The BEP Phase 2 module 506 reads the contents of the transaction file 504 after receiving the TRANSACTION signal from BEP Phase 1 module 502 and processes the data into the discovery database 314. In particular, upon receiving the TRANSACTION signal, the BEP Phase 2 module 506 accesses the contents of the transaction file 504 and reads the next transaction record, formats the transaction record, if necessary, into the appropriate form of the discovery database 314, inserts the contents of the transaction record into the discovery database 314, and then deletes the transaction record from the transaction file 504.

It is noted that the separation of the overall BEP 312 into separate processes permits servicing each ADA transaction more quickly. In particular, the collection of the HTTP POST transaction contents into the transaction file 504 may be completed more rapidly, which may be necessary if several ADA modules are attempting to send management information at about the same time. The processing of the transaction record into the discovery database 314 is more time consuming, but is deferred. This allows quick release of the ADA HTTP client and faster response by the management server 102 Of course, the BEP process could be implemented as a single process, in which case the transaction file 504 would not be necessary.

It is now appreciated that active self discovery of devices attached to or otherwise participating in a network according to the present invention provides several benefits. Active self discovery provides for improved transmission of device descriptive information, such as the type and nature of the device along with the device network address. The management data is automatically provided to at least one designated management server upon initialization, power-up or reset using the predetermined server address, thereby eliminating the need for traditional network discovery, such as explicit discovery, IP pinging, or router tables. Any changes in the status, management data and/or a configuration of the managed device, including the managed device address, are automatically forwarded to a discovery database of the management server. In this manner, a management server is not required to continuously or periodically poll, interrupt or ping the network to obtain or to update management information. Active self discovery allows managed devices to have dynamically assigned network addresses.

The ADA may provide discovery or management information to more than one management server if desired. As such, the discovery database may provide a focal point for all management software components to find, access and manage specific devices.

In a preferred embodiment, active self discovery is implemented using ubiquitous industry standard protocols and components to capture and process device discovery information, such as HTTP, web servers, back end processes, etc. The use of HTTP enables a platform independent implementation, which is an important attribute in a network management environment. The splitting of the back end process into separate processes and an intermediate file allows the deferral of processing ADA HTTP POST transactions to permit quicker transaction response. The use of discovery data entity bodies or payloads with descriptors permits the format of the discovery data to be self-describing, as previously described, which further allows the construction of a web server back end process that is able to accept discovery data from multiple sources in multiple formats.

The discovery database is not limited to device information collected by active self discovery, but may also serve as a repository for device information collected by other methods. Thus, the discovery database serves as an integration point for management software components. The optional use of data compression of discovery data permits transmission of large discovery data bodies if desired while reducing network bandwidth requirements. The optional use of encryption enables a higher level of privacy for the discovery data.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A network management active self discovery system for a network, comprising:
    a management server, for coupling to the network and having a corresponding server address, that includes a management database that is used to store management information and corresponding network addresses received from the network; and
    at least one managed device, for coupling to the network, that includes an active discovery agent which initiates its management by the management server by sending management information including its network address via the network using the server address, wherein the management server further comprises:
        a network interface for coupling to the network; and
        a back end module coupled to the network interface and the management database that processes management information and network addresses received by the network interface into the management database, wherein the back end module further comprises:
            a transaction file;
            a first module coupled to the network interface that transfers management information and addresses into the transaction file as received; and
            a second module that processes management information and addresses from the transaction file into the management database.

2. The network management active self discovery system of claim 1, wherein the at least one managed device sends its management information and its network address upon initialization.

3. The network management active self discovery system of claim 1, further comprising:
    the at least one managed device sending updated management information to the management server using the server address if and when the management information changes.

4. The network management active self discovery system of claim 3, wherein changes of the management information include status and configuration changes of the at least one managed device.

5. The network management active self discovery system of claim 3, wherein the at least one managed device sends a new network address to the management server if the network address of the at least one managed device is changed.

6. The network management active self discovery system of claim 1, further comprising:
    the active discovery agent supporting the HyperText Transfer Protocol (HTTP);
    the management server including a web server that supports the HTTP; and
    the active discovery agent and the web server communicating according to HTTP.

7. The network management active self discovery system of claim 6, wherein the server address is in symbolic form and is resolved into an Internet Protocol address.

8. The network management active self discovery system of claim 6, further comprising:
    the active discovery agent formulating the management information and the network address of the at least one managed device into an HTTP post transaction that is sent to the web server.

9. The network management active self discovery system of claim 8, wherein the HTTP post transaction includes an entity body with an HTTP descriptor tag.

10. A method of active self discovery of devices of a network that includes at least one managed device and a management server, comprising steps of
    providing a managed device with a server address corresponding to the management server;
    formulating, by the managed device, management information and a network address corresponding to the managed device into a management package; and
    sending, by the managed device, the management package to the management server using the server address to initiate management of the managed device by the management server;
    processing, by the management server, any management packages received via the network into a management database, wherein said processing further comprises steps of:
        transferring, by the management server, any management packages received via the network into an intermediate file; and
        processing by the management server, any management packages written to the intermediate file into the management database.

11. The method of claim 10, further comprising steps of:
    during operation and upon a change of the management information of the managed device, formulating, by the managed device, an updated management package; and
    sending, by the managed device, the updated management package to the management server using the server address.

12. The method of claim 11, further comprising steps of:
    during operation and upon a change of the network address of the managed device, formulating, by the managed device, an updated management package including a new network address for the managed device; and sending, by the managed device, the updated management package to the management server using the server address.

13. The method of claim 10, further comprising steps of:

said formulating comprising formulating a management package into a HyperText Transfer Protocol (HTTP) post transaction; and said sending comprising sending the HTTP post transaction to the management server according to HTTP.

14. The method of claim 13, wherein said formulating comprises formulating a management package into an HTTP post transaction including a entity body and a descriptor tag.

15. The method of claim 10, wherein the step of formulating further comprises encrypting the management information.

16. The method of claim 10, wherein the step of formulating further comprises a step of compressing the management information.

* * * * *